(12) United States Patent
Hegde et al.

(10) Patent No.: US 10,007,578 B2
(45) Date of Patent: Jun. 26, 2018

(54) APPLICATION PERFORMANCE USING PACKAGE AND CATALOG CACHE PREFETCHING DURING DATABASE RECOVERY

(71) Applicant: International Business Machines Corporation, Armonk, NY (US)

(72) Inventors: Santosh Hegde, Bangalore (IN); Mahadev Khapali, Bangalore (IN); Mohan Narayanswamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 14/993,398

(22) Filed: Jan. 12, 2016

(65) Prior Publication Data

US 2017/0199790 A1    Jul. 13, 2017

(51) Int. Cl.
*G06F 11/14* (2006.01)
*G06F 17/30* (2006.01)

(52) U.S. Cl.
CPC .... *G06F 11/1464* (2013.01); *G06F 17/30339* (2013.01); *G06F 2201/84* (2013.01)

(58) Field of Classification Search
CPC ............. G06F 11/1438; G06F 11/1471; G06F 17/3048; G06F 2209/542; G06F 8/316
See application file for complete search history.

(56) References Cited

U.S. PATENT DOCUMENTS

| | | | |
|---|---|---|---|
| 5,946,698 A | 8/1999 | Lomet | |
| 7,447,710 B2 | 11/2008 | Sampath et al. | |
| 8,543,554 B1* | 9/2013 | Singh | G06F 17/3048 370/389 |
| 2005/0021514 A1* | 1/2005 | Barga | G06F 11/1438 |
| 2005/0251540 A1* | 11/2005 | Sim-Tang | G06Q 10/06 |
| 2006/0026570 A1* | 2/2006 | Chan | G06F 8/316 717/127 |
| 2006/0041602 A1 | 2/2006 | Lomet et al. | |
| 2006/0179147 A1 | 8/2006 | Tran et al. | |
| 2012/0030169 A1 | 2/2012 | Allen et al. | |

OTHER PUBLICATIONS

Hegde et al., "Improving Application Performance Using Package and Catalog Cache Prefetching During Database Recovery", U.S. Appl. No. 15/090,906, filed Apr. 5, 2016, 20 pages.
IBM Appendix P, list of patents or patent applications treated as related, Apr. 5, 2016, 2 pages.

* cited by examiner

*Primary Examiner* — Taelor Kim
(74) *Attorney, Agent, or Firm* — Gilbert Harmon, Jr.

(57) ABSTRACT

An approach for improving application performance after database recovery is provided, the approach involving tracking one or more applications connecting to a database, tracking metadata in memory on a server computer, wherein the metadata is accessed by the one or more applications, recovering the metadata during a database recovery occurring after a database crash and repopulating the metadata in memory on the server computer during the database recovery, wherein the repopulating occurs prior to the metadata being requested by the one or more applications.

14 Claims, 3 Drawing Sheets

APPLICATION PERFORMANCE USING PACKAGE AND CATALOG CACHE PREFETCHING DURING DATABASE RECOVERY

BACKGROUND

The present invention relates generally to the field of databases, and more particularly to database recovery.

Databases are computing structures which can store and organize collections of digital data and information. Databases can used by organizations, companies and businesses to store and manage large volumes of data that they use and create. Some examples of databases are the inventories of retail stores, digital library cataloging systems and a digital collection of employee information for a corporation. Some software applications can access databases to make use of the data they contain. Occasionally, due to a number of circumstances such as hardware failures or a server computer losing power, database crashes can occur where the database goes temporarily offline. When a database crashes, database recovery is the process by which lost data is repopulated into the database.

SUMMARY

According to one embodiment of the present invention, a method for improving application performance after database recovery is provided, the method comprising tracking one or more applications connecting to a database; tracking metadata in memory on a server computer, wherein the metadata is accessed by the one or more applications; responsive to a database crash, recovering the metadata during a database recovery; and repopulating the metadata in memory on the server computer during the database recovery, wherein the repopulating occurs prior to the metadata being requested by the one or more applications. A corresponding computer program product and computer system are also disclosed herein.

DETAILED DESCRIPTION

Embodiments of the present invention recognize that software programs reconnecting to a database after a database crash can encounter performance issues due to metadata having been deleted from memory during the database crash. Applications that were connected to the database at the time of the crash can automatically reconnect back to it after the database has been recovered, however, these applications can lag in command execution time after reconnecting because they access memory (e.g., cache memory) on the database server for metadata which was wiped out from the cache memory during the crash and needs to be reloaded from a more persistent form of storage, such as, but not limited to, a hard drive disk. Embodiments of the present invention therefore present a solution for improving application performance post database recovery wherein metadata such as, but not limited to, package entries and catalog entries, are loaded from persistent storage to memory during the database recovery process, i.e., the metadata is prefetched prior to applications reconnecting to the database and requesting the metadata from memory on the database server.

Package entries can be information that control the compilation and execution of requests made in a database, wherein the requests can be in a programming language such as, but not limited to Structured Query Language (SQL). Catalog entries can comprise metadata, (associated with database objects such as tables, indexes, sequences, etc. . . .) from the database catalog which are stored in memory so that applications connected to the database may have rapid access to information from the database catalog. It is further to be understood that although the disclosure provided herein refers primarily to package and catalog entries stored in cache memory, according to other embodiments the entries may be stored in other forms of memory.

Figure 1A:
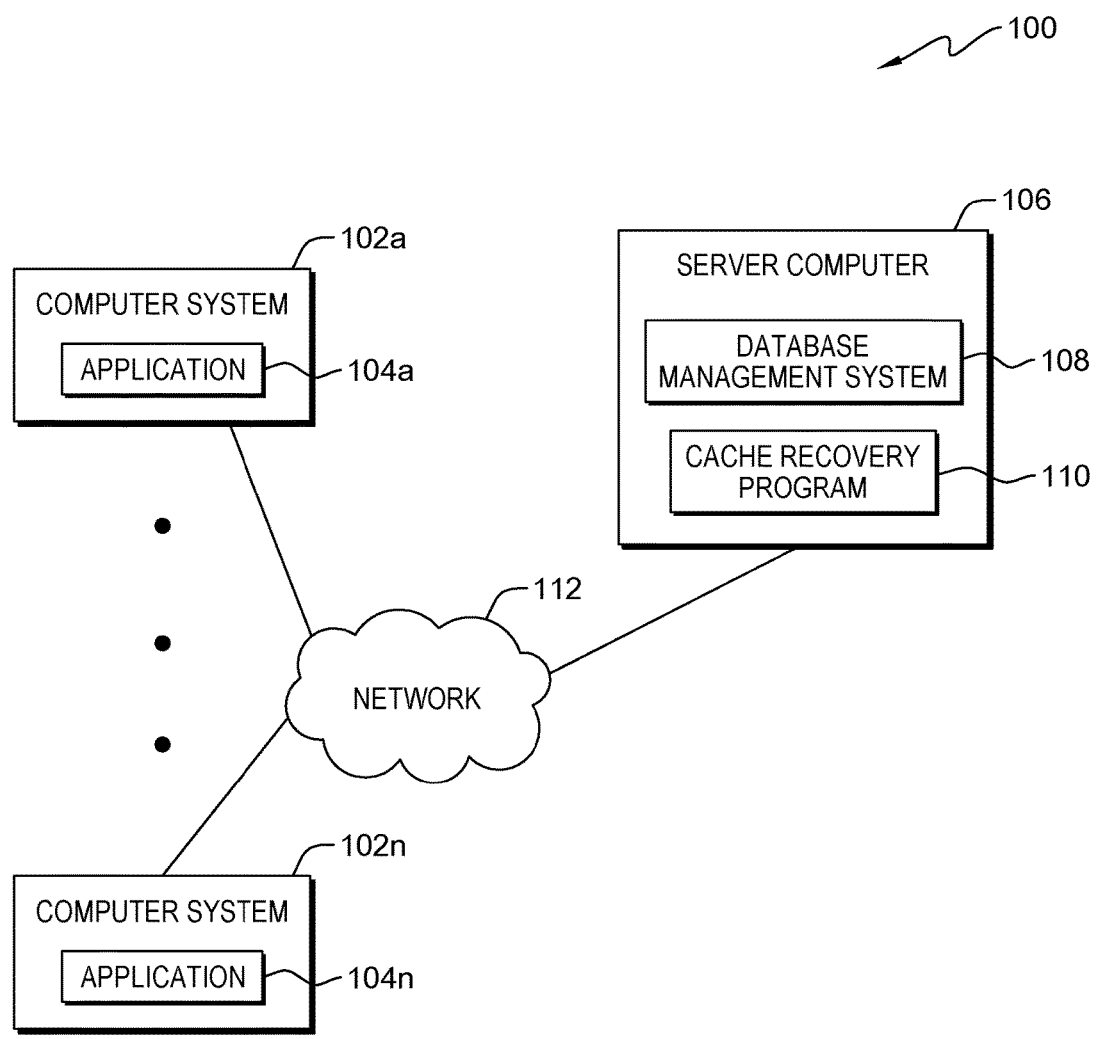
FIG. 1A-B is a functional block diagram illustrating a distributed data processing environment and a functional block diagram illustrating components of a cache recovery program, respectively, in accordance with an embodiment of the present invention.

The present invention will now be described in detail with reference to the figures. FIG. 1A is a functional block diagram illustrating a distributed data processing environment 100, in accordance with one embodiment of the present invention. Distributed data processing environment 100 includes computer systems 102a-n and server computer 106, all interconnected over network 112. It should be noted that computer systems 102a-n is representative of any number of computer systems.

Computer systems 102a-n can each respectively be a laptop computer, tablet computer, netbook computer, personal computer (PC), a desktop computer, a personal digital assistant (PDA), a smart phone, or any programmable electronic device capable of communicating with server computer 106 via network 112. Computer systems 102a-n comprise applications 104a-n, respectively, which can be software programs configured to access a database through server computer 106.

Server computer 106 can be a laptop computer, tablet computer, netbook computer, personal computer (PC), a desktop computer, a personal digital assistant (PDA), a smart phone, or any programmable electronic device capable of communicating with computer systems 102a-n via network 112. Server computer 106 comprises database management system (DBMS) 108 (such as DB2 by International Business Machines Corporation, for example) and cache recovery program 110. DBMS 108 is a software program configured to serve as an interface between a database and one or more end users on computer systems 102a-n. DBMS 108 can, for example, create, update, retrieve and manage data stored on the database and can limit the extent of access of the one or more end users to the database.

Cache recovery program 110 is a software program that can track which of applications 104a-n are connected to the database through DBMS 108 and can track the package entries and catalog entries being used by applications 104a-n for execution, the package entries and catalog entries being stored in memory such as, but not limited to, cache memory, on server computer 106. Cache recovery program 110 is also configured to repopulate package entries and catalog entries into cache memory during database recovery, prior to applications 104a-n attempting to access the entries. It should be noted that according to some embodiments, cache recovery program can be a component of DBMS 108. Server computer 106 can include internal and external hardware components, as depicted and described in further detail with respect to FIG. 3.

Network 112 can be, for example, a local area network (LAN), a wide area network (WAN) such as the Internet, or a combination of the two, and can include wired, wireless, or fiber optic connections. In general, network 112 can be any combination of connections and protocols that will support communications between computer systems 102a-n and server computer 106.

Figure 1B:
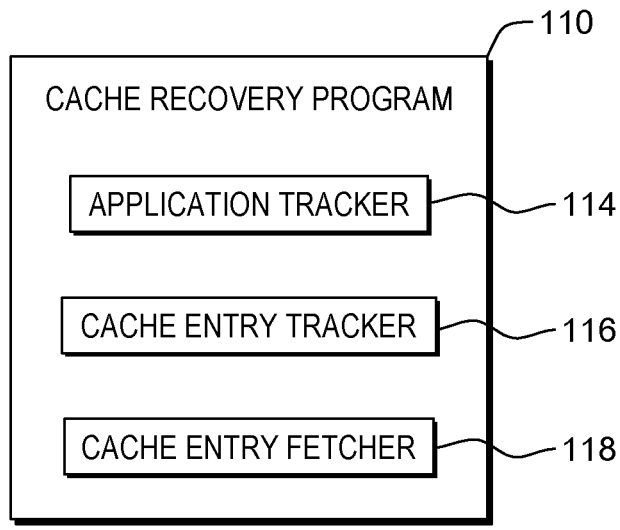

FIG. 1B is a functional block diagram illustrating components of cache recovery program 110, in accordance with an embodiment of the present invention. Cache recovery program 110 comprises application tracker 114, cache entry tracker 116 and cache entry fetcher 118. Application tracker 114 can create an applications table which tracks applications that connect to DBMS 108, wherein the applications table can comprise the names of the applications (e.g., applications 104a-n), an ID number for each application (which can, for example, uniquely associate it with a host computer, such as computer system 102a-n, respectively) and an application state. The application state for a given application can be, for example, CONNECT, if the given application is connected to DBMS 108 or DISCONNECT, if the given application disconnects from DBMS 108, not including disconnections due to a database crash. Application tracker 114 can update the application state on the applications table for applications 104a-n as they each respectively connect and/or disconnect.

Cache entry tracker 116 can create an entries table which can track package entries and catalog entries stored in cache memory on server computer 106 being used for program execution by applications 104a-n. The entries table can comprise package entries and catalog entries for each of applications 104a-n which have an application state of CONNECT, for example. The package entries and catalog entries in the entries table can be updated (e.g., added, edited or removed) by cache entry tracker 116 to be consistent with the state of the entries in cache memory on server computer 106.

It should be understood that the applications table and entries table can be stored in persistent storage (e.g., a hard drive disk) on server computer 106 and can be automatically updated in real time by application tracker 114 and cache entry tracker 116, respectively. Further, according to other embodiments of the present invention, application and entry tracking can be done as previously described on one or more previously existing system tables on server computer 106.

Cache entry fetcher 118 is a subsystem of cache recovery program 110 configured to repopulate cache memory on server computer 106 with package entries and catalog entries in use by applications 104a-n at the time of the database crash. Cache entry fetcher 118 can recover the applications table at the time of database recovery and access it to determine which of applications 104a-n had an application state of CONNECT at the time of the database crash. Cache entry fetcher 118 can also recover the entries table during database recovery and access it to repopulate the package entries and catalog entries (listed in the table) into cache memory.

Figure 2:
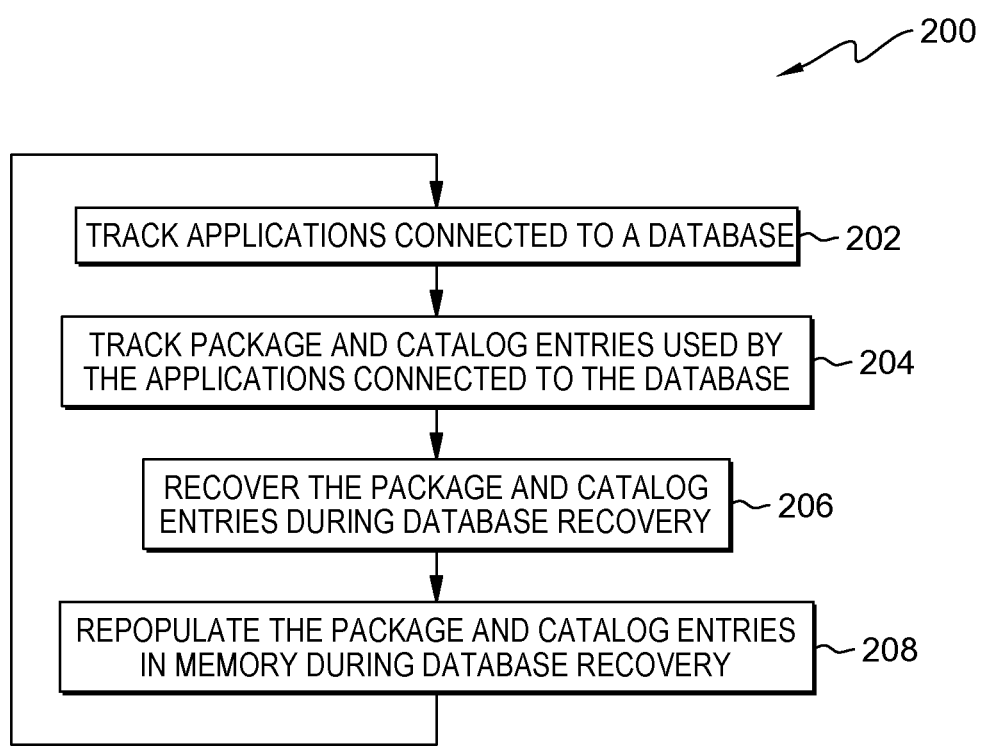
FIG. 2 is a flowchart depicting operational steps of the cache recovery program on a server computer within the data processing environment of FIG. 1, in accordance with an embodiment of the present invention.

Turning to FIG. 2, a flowchart 200 depicting operational steps of cache recovery program 110 is presented, in accordance with an embodiment of the present invention. Application tracker 114, at block 202, creates an applications table (as previously described) to keep track of the respective applications states of applications 104a-n. Application tracker 114 can update the information on the applications table (e.g., application names, ID numbers and application states) in real time as applications 104a-n connect and disconnect from DBMS 108. Cache entry tracker 116, at block 204, creates an entries table (as previously described) which comprises entries (e.g., package and catalog entries) stored in cache memory on server computer 106, wherein the entries are in use by applications 104a-n for program instruction execution. Package entries and catalog entries on the entries tables can be updated (e.g., added, removed or edited) by cache entry tracker 116 in real time to be consistent with the state of the package entries and catalog entries in cache memory on server computer 106.

When a database hosted by server computer 106 crashes and the database recovery process begins, cache entry fetcher 118 can, at block 206, load (i.e., recover), during the database recovery, the applications table and entries table from persistent storage for cache entry prefetching. Cache entry fetcher 118 can scan the recovered applications table and entries table to determine which of applications 104a-n were connected to DBMS 108 at the time of the database crash (and thus are likely to reconnect to DBMS 108 after database recovery) and which entries were in cache memory at the time of the crash, in use by connected applications 104a-n. Package entries and catalog entries present on the entries table recovered during database recovery can be repopulated into cache memory, at block 208, by cache entry fetcher 118 during the database recovery, prior to applications 104a-n requesting the entries, thus improving application performance for applications 104a-n reconnecting to DBMS 108 after the database recovery.

Figure 3:
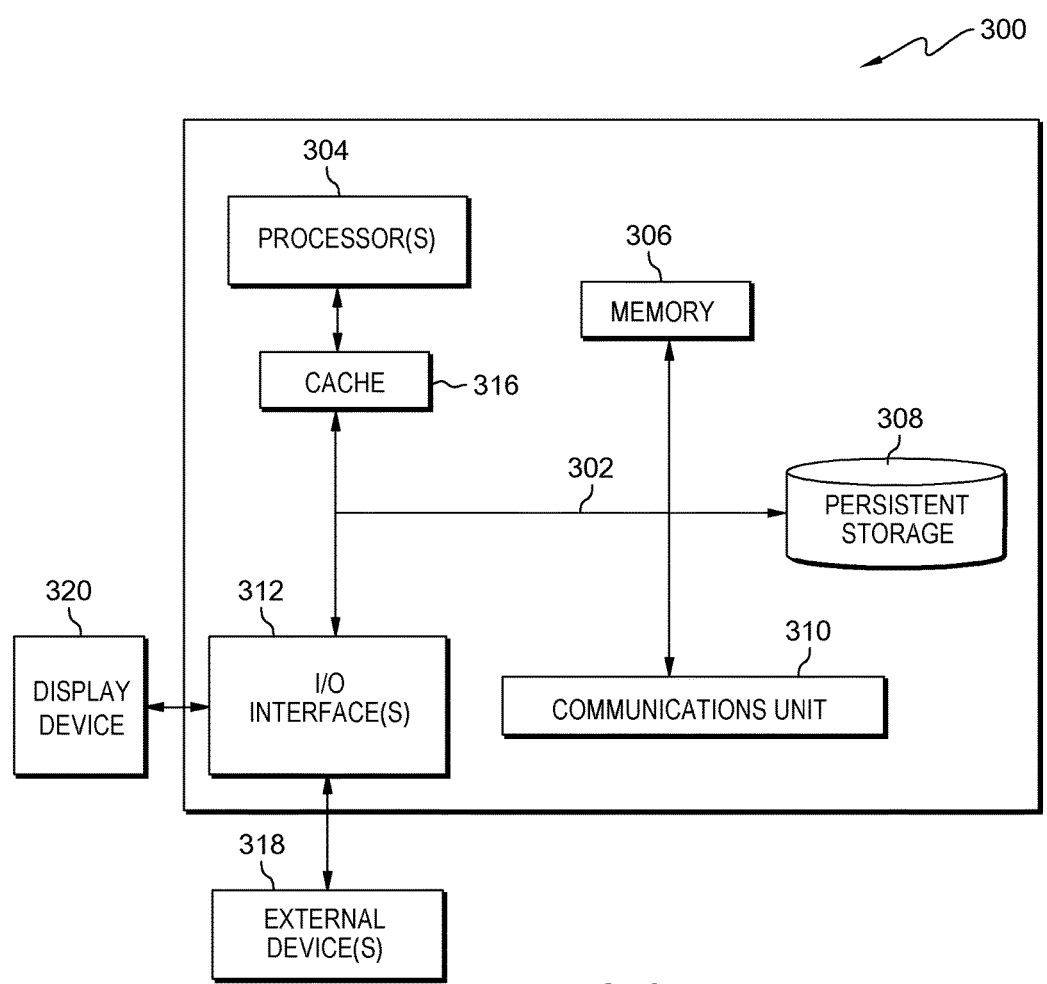
FIG. 3 is a block diagram of components of the server computer executing the cache recovery program, in accordance with an embodiment of the present invention.

FIG. 3 depicts a block diagram 300 of components of server computer 106, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 106 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Cache recovery program 110 can be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 can provide communications through the use of either or both physical and wireless communications links. Cache recovery program 110 can be downloaded to persistent storage 408 through communications unit 410.

I/O interface(s) 312 allows for input and output of data with other devices that can be connected to server computer 106. For example, I/O interface 312 can provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., cache recovery program 110, can be stored on such portable computer readable storage media and can be loaded onto persistent storage 308 via I/O interface(s) 312. I/O interface(s) 312 also connect to a display 320.

Display 320 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for improving application performance after database recovery, the method comprising:
    tracking one or more applications connecting to a database, wherein the one or more applications are tracked in an applications table comprising an application identity (ID) number;
    tracking metadata in memory on a server computer, wherein the metadata comprises at least one of package entries or catalog entries and is accessed by the one or more applications;
    responsive to a crash of the database, recovering the metadata from persistent storage on a server computer during a database recovery; and
    repopulating, based on at least one application associated with the applications table having an application state of CONNECT, the metadata in memory on the server computer during the database recovery, wherein the state of CONNECT comprises connected to the database and wherein the repopulating occurs prior to the metadata being requested by the one or more applications.

2. The method of claim 1, wherein the memory is cache memory.

3. The method of claim 1, wherein the applications table further comprises at least one of application names or application states.

4. The method of claim 1, wherein the at least one of package entries and catalog entries are tracked on an entries table.

5. The method of claim 1, wherein recovering the metadata comprises recovering an applications table and an entries table.

6. A computer program product for improving application performance after database recovery, the computer program product comprising:
    one or more computer readable storage media and program instructions stored on the one or more computer readable storage media, the program instructions comprising:
        program instructions to track one or more applications connecting to a database, wherein the one or more applications are tracked in an applications table comprising an application identity (ID) number;
        program instructions to track metadata in memory on a server computer, wherein the metadata comprises at least one of package entries or catalog entries and is accessed by the one or more applications;
        program instructions to, responsive to a crash of the database, recover the metadata from persistent storage on a server computer during a database recovery; and
        program instructions to repopulate, based on at least one application associated with the applications table having an application state of CONNECT, the metadata in memory on the server computer during the database recovery, wherein the state of CONNECT comprises connected to the database and wherein the repopulating occurs prior to the metadata being requested by the one or more applications.

7. The computer program product of claim 6, wherein the memory is cache memory.

8. The computer program product of claim 6, wherein the applications table further comprises at least one of application names or application states.

9. The computer program product of claim 6, wherein the at least one of package entries and catalog entries are tracked on an entries table.

10. The computer program product of claim 6, wherein recovering the metadata comprises recovering an applications table and an entries table.

11. A computer system for improving application performance after database recovery, the computer system comprising:
    one or more computer processors;
    one or more computer readable storage media;
    program instructions stored on the one or more computer readable storage media for execution by at least one of the one or more processors, the program instructions comprising:
        program instructions to track one or more applications connecting to a database, wherein the one or more applications are tracked in an applications table comprising an application identity (ID) number;
        program instructions to track metadata in cache memory on a server computer, wherein the metadata comprises at least one of package entries or catalog entries and is accessed by the one or more applications;

program instructions to, responsive to a crash of the database, recover the metadata from persistent storage on a server computer during a database recovery; and program instructions to repopulate, based on at least one application associated with the applications table having an application state of CONNECT, the metadata in memory on the server computer during the database recovery, wherein the state of CONNECT comprises connected to the database and wherein the repopulating occurs prior to the metadata being requested by the one or more applications.

12. The computer system of claim 11, wherein the applications table comprises at least one of application names or application states.

13. The computer system of claim 11, wherein the at least one of package entries and catalog entries are tracked on an entries table.

14. The computer system of claim 11, wherein recovering the metadata comprises recovering an applications table and an entries table.

* * * * *